United States Patent [19]

Needham

[11] Patent Number: 5,280,937
[45] Date of Patent: Jan. 25, 1994

[54] STEERED WHEELED FRAMEWORK

[76] Inventor: Dennis Needham, 3724 Del Rio Dr., Fort Worth, Tex. 76133

[21] Appl. No.: 845,093

[22] Filed: Mar. 3, 1992

[51] Int. Cl.⁵ .................. B62M 1/02; B62K 21/18
[52] U.S. Cl. .................................. 280/259; 280/270; 280/304.1
[58] Field of Search ............... 280/250.1, 259, 304.1, 280/287, 288.1, 250, 234, 240, 263, 270

[56] References Cited

U.S. PATENT DOCUMENTS

| | | | |
|---|---|---|---|
| 881,808 | 3/1908 | Larson | 280/270 |
| 4,415,056 | 11/1983 | Smith | 280/203 X |
| 4,483,548 | 11/1984 | Zirrilo | 280/304.1 |
| 4,572,501 | 2/1986 | Durham et al. | 280/250.1 |
| 4,798,395 | 1/1989 | Shaffer et al. | 280/240 |

FOREIGN PATENT DOCUMENTS 0529233  5/1957  Belgium ................... 280/250.1

Primary Examiner—Margaret A. Focarino
Assistant Examiner—Victor E. Johnson
Attorney, Agent, or Firm—Michael P. Breston

[57] ABSTRACT

The front-driven, wheeled framework has a rear frame, at least one rotatably mounted rear wheel on the rear frame, and a forward frame. The forward frame is pivotably attached to a steering frame. A single front wheel is mounted on the steering frame. A limb-operated driving means rotates the front wheel through a transmission means. A steering means steers the propelled front wheel in response to a steering force and independently of the driving means.

23 Claims, 7 Drawing Sheets

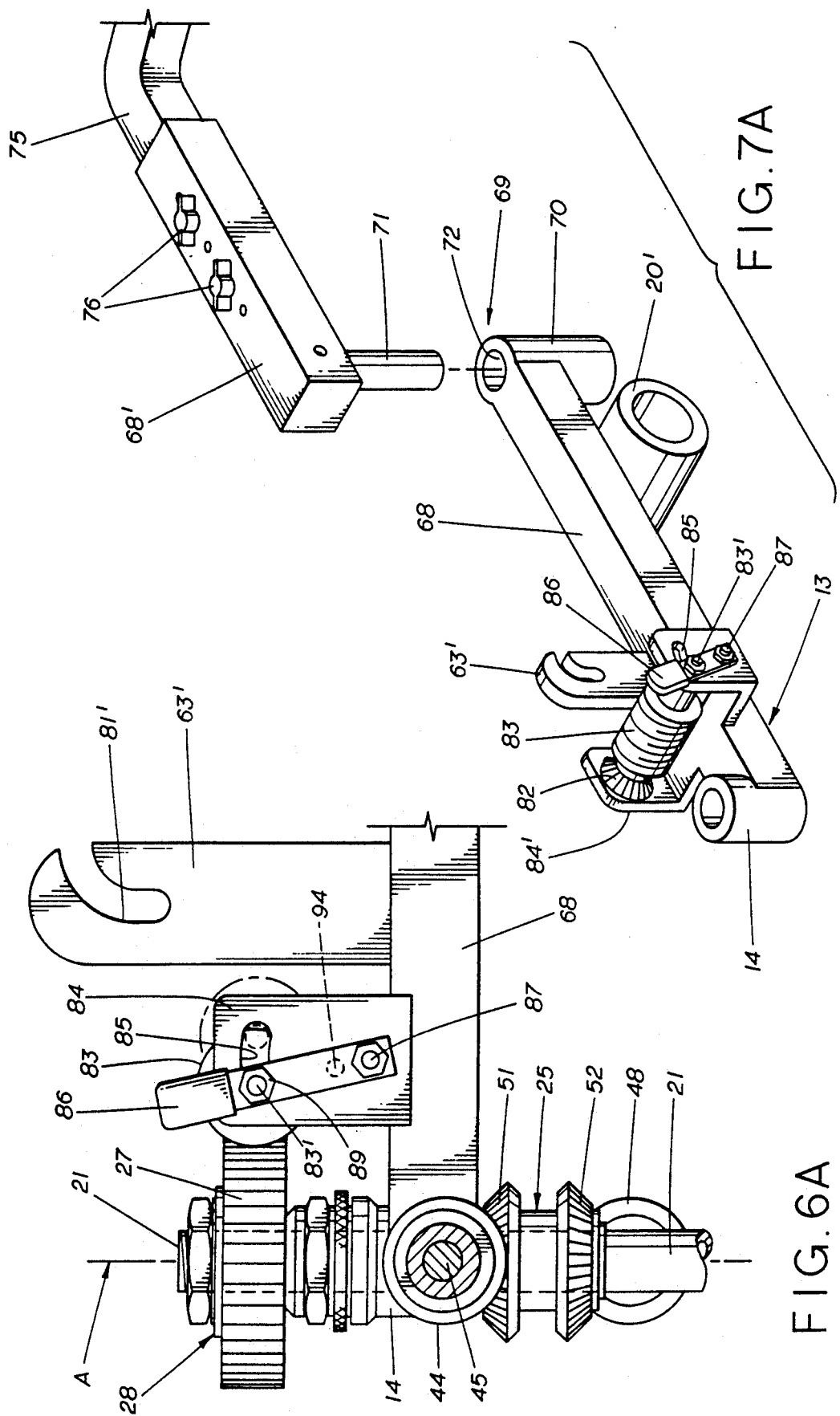

STEERED WHEELED FRAMEWORK

BACKGROUND OF THE INVENTION

1. Field of the Invention

This invention relates in general to an independently steered wheeled framework which can assume the shape of a bicycle, tricycle, or other type vehicle, and is particularly adapted to and will be illustrated primarily in connection with a wheelchair.

2. Description of the Prior Art

From their early introduction, wheelchairs became very popular with disabled persons in or out of hospitals because they provided them with needed mobility.

A conventional wheelchair framework has vertically arranged, spaced apart tubular side frame members supporting a chair. Each side frame includes a horizontally disposed arm rest. Transverse axles are attached to the side frame members. Large rear wheels are journaled to the axles. Front-mounted small caster wheels support and direct the front end of the wheelchair. Each rear wheel has a hand-grip ring for hand propulsion and steering of the wheelchair.

Subsequently, various attachments to wheelchairs were proposed, using hand or foot propelled front wheels, in order to extend their range and speed of travel and to prevent rider fatigue which may result from prolonged use of the steering hand-grip rings.

In practice, such wheeled attachments were intended to convert a wheelchair framework from a stationary position, with its caster wheels on the ground, to a mobilized tricycle by adding a front wheel and elevating its caster wheels above ground.

It has also been suggested to immobilize such a tricycle by elevating the added front wheel and using its propulsion means for muscular exercise and rehabilitation purposes.

Such proposed attachments to wheelchairs are described, for example, in U.S. Pat. Nos. 4,720,117, 4,572,501 and, 4,824,132.

In general, such proposed wheeled attachments have been found by users to be difficult to mount on and dismount from a wheelchair. These attachments frequently require tools and/or the assistance from a caregiver. They are difficult to steer in a straight line, or over irregular, uneven and obstructed ground. They share the inherent problems of bicycles and tricycles: such as rider's early fatigue, especially over steep terrain due to the need for simultaneous movement of the pedals, front wheel and handlebar. Also, the rider tends to lean inward especially while negotiating sharp turns and around obstructions.

This "leaning inward" problem and the various proposed solutions thereto are well described in U.S. Pat. No. 4,720,117, starting at Col.1, ln.65 and ending at Col.2, ln.68, and such description is herein incorporated by reference.

But, since the attachment described in U.S. Pat. No. 4,720,117 is based on simultaneous movement of its hand cranks 18 and front wheel 30, it does not provide for independent steering of its wheel 30.

Accordingly, it is a main object of this invention to overcome the above-mentioned and other apparent drawbacks of known wheeled attachments and to provide a novel independently-steered wheeled framework.

It is a further object of this invention to eliminate the need for front caster wheels in wheelchairs.

It is yet a further object to allow the conversion of a wheelchair from outdoor use to indoor use to be easily accomplished by its user without the need for tools or assistance from others.

SUMMARY OF THE INVENTION

The steered wheeled framework of this invention comprises a rear frame having at least one rotatably mounted rear wheel. A forward frame has a coupling member to which is pivotably attached a steering frame for movement in opposite angular directions. A limb-operated driving means is mounted on the forward frame, and a front wheel is mounted on the steering frame. The driving means rotates the front wheel through a transmission means. In response to a steering force, a steering means steers the propelled front wheel, and hence the wheeled framework, independently of the driving means.

In one embodiment, a crank is rotatably mounted on the forward frame. The steering frame includes an upright shaft which is rotatably received within the coupling member of the forward frame. The steering means includes a steering column which is geared through a worm to a worm gear attached to the tip of the upright shaft which has a dependent fork on which is mounted the front wheel. A driving gear train on the forward frame transmits torque through a miter gear unit to a driven gear train on the steering frame. The driven gear train drives the front wheel through a sprocket wheel.

BRIEF DESCRIPTION OF THE DRAWINGS

FIG. 6A is a view taken on line 6A—6A on FIG. 6;

FIG. 7A is an exploded, partial, detail, isometric view of the hinge assembly between the forward frame and an extension sleeve carried by an arm attached to a side frame of the wheelchair;

DESCRIPTION OF PREFERRED EMBODIMENTS

Figure 1:
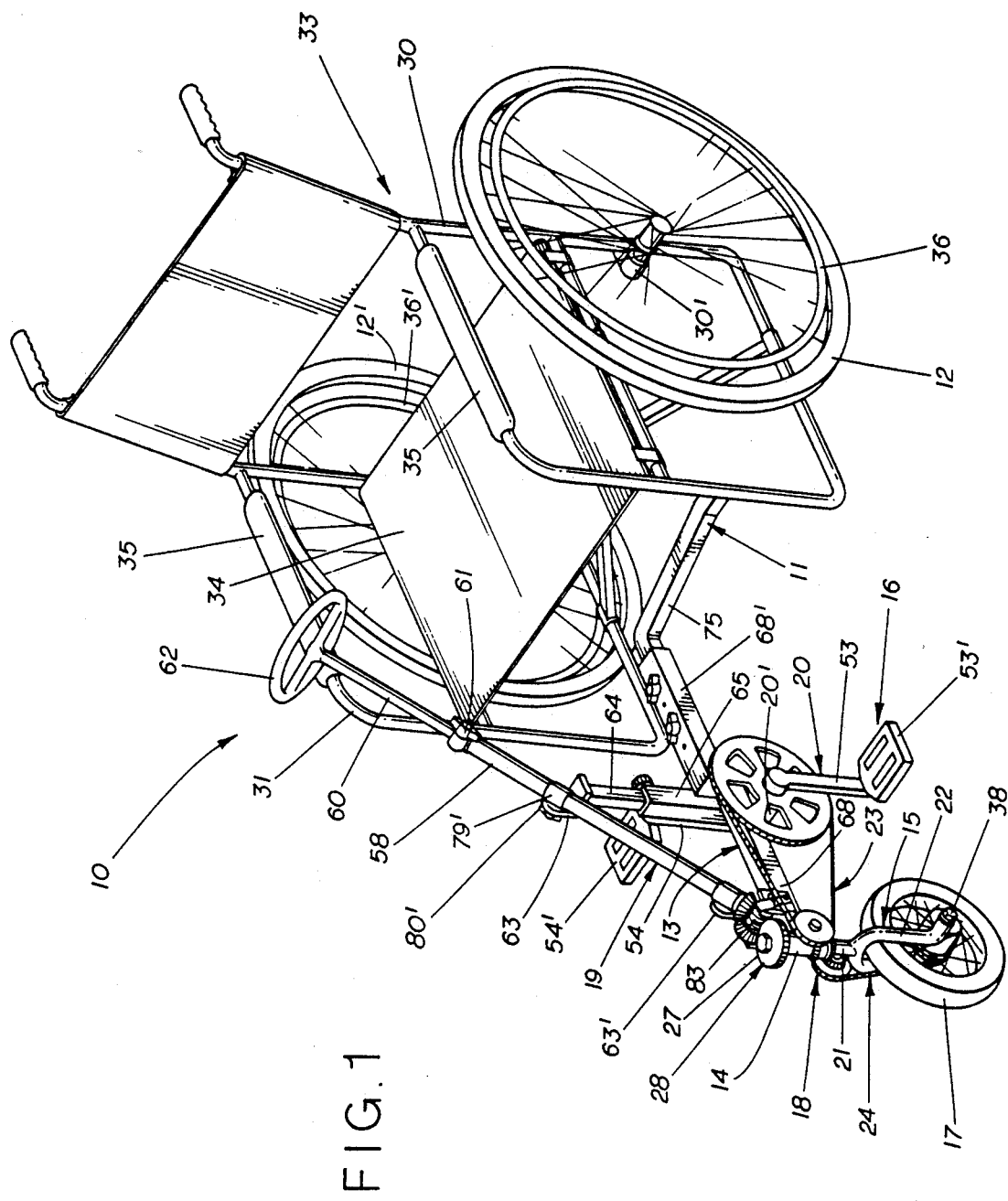
FIG. 1 is an isometric view of the wheeled framework of the present invention shown in its mobile cycle mode and utilizing a foot-operated propulsion means.

In the description and in the drawings, the same reference characters will be used to designate the same or similar parts to better illustrate the scope of the invention. Similar parts are sometimes also designated with the same numbers followed by a prime (').

The independently steered wheeled framework of this invention can assume the shape of a bicycle, tricycle, or other type vehicle, and is particularly adapted to and will be illustrated primarily in connection with a wheelchair.

First will be described the common sub-assemblies and parts that the diverse embodiments would contain. This description will be followed by the inherent parts required from a wheelchair.

Figure 12:
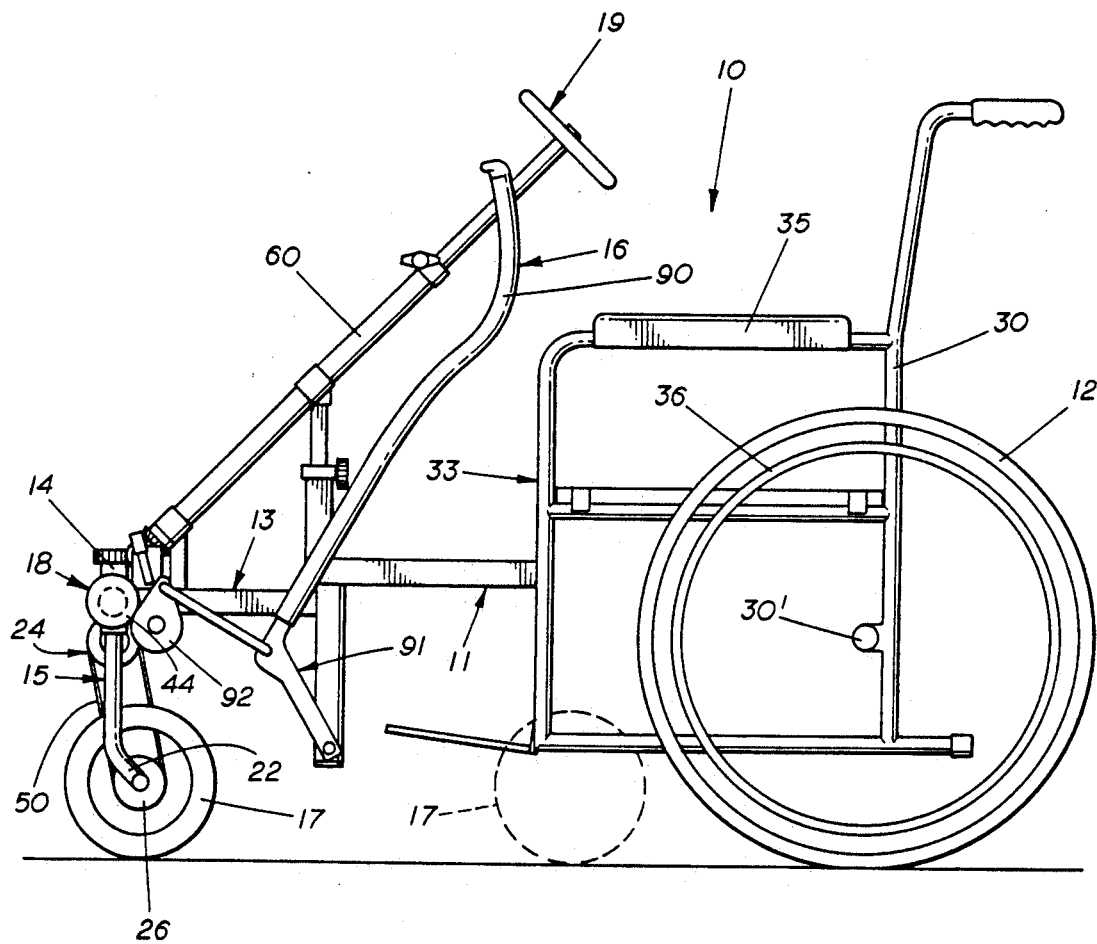
FIG. 12 is an elevational view of the left side of the wheeled framework utilizing a hand-operated propulsion means instead of a foot-operated propulsion means.

The independently steered framework of this invention, generally designated as 10, is shown in FIG. 1 in its mobile cycle mode. It comprises a rear frame 11 having at least one rotatably mounted rear wheel 12. A forward frame 13 has a coupling member 14 to which is pivotably attached a steering frame 15 for movement in opposite angular directions. A limb-operated driving means 16 (FIGS. 1,5,12) is mounted on frame 13, and a front wheel 17 is mounted on steering frame 15.

The driving means 16 rotates front wheel 17 through a transmission means 18. A steering means 19 steers the propelled front wheel 17 and hence the wheeled framework 10 in response to a steering force and independently of driving means 16.

In the embodiment of FIG. 1, the limb-operated driving means 16 includes a crank 20 (FIG. 7) which is rotatably mounted within a cylindrical casing 20' attached to forward frame 13. The steering frame 15 (FIG. 4) includes an upright shaft 21 and a dependent fork 22 having legs 22a,22b. Upright shaft 21 is rotatably attached to coupling member 14.

The transmission means 18 (FIG. 5) includes a driving gear train 23 movably attached to forward frame 13, and a driven gear train 24 which is movably attached to steering frame 15.

A torque-transmitting miter gear unit 25 (FIGS. 4,5) engages both driving gear train 23 and driven gear train 24 so as to transfer torque between them. The driven gear train 24 drives a sprocket wheel 26 which rotates front wheel 17.

In accordance with a preferred embodiment of this invention, coupling member 14 (FIGS. 4,5) has a tubular shape which coaxially and rotatably receives upright shaft 21. A worm gear 27 (FIG. 6) is fixedly attached to the top end of shaft 21. Worm gear 27 operatively interlocks with a steering gear train 28 which forms part of steering means 19.

For use by disabled persons, rear frame 11 (FIG. 1) has ground-engaging, support wheels 12-12' that are parallel to each other to enable the wheeled framework 10 to move in a straight line.

Figure 2:
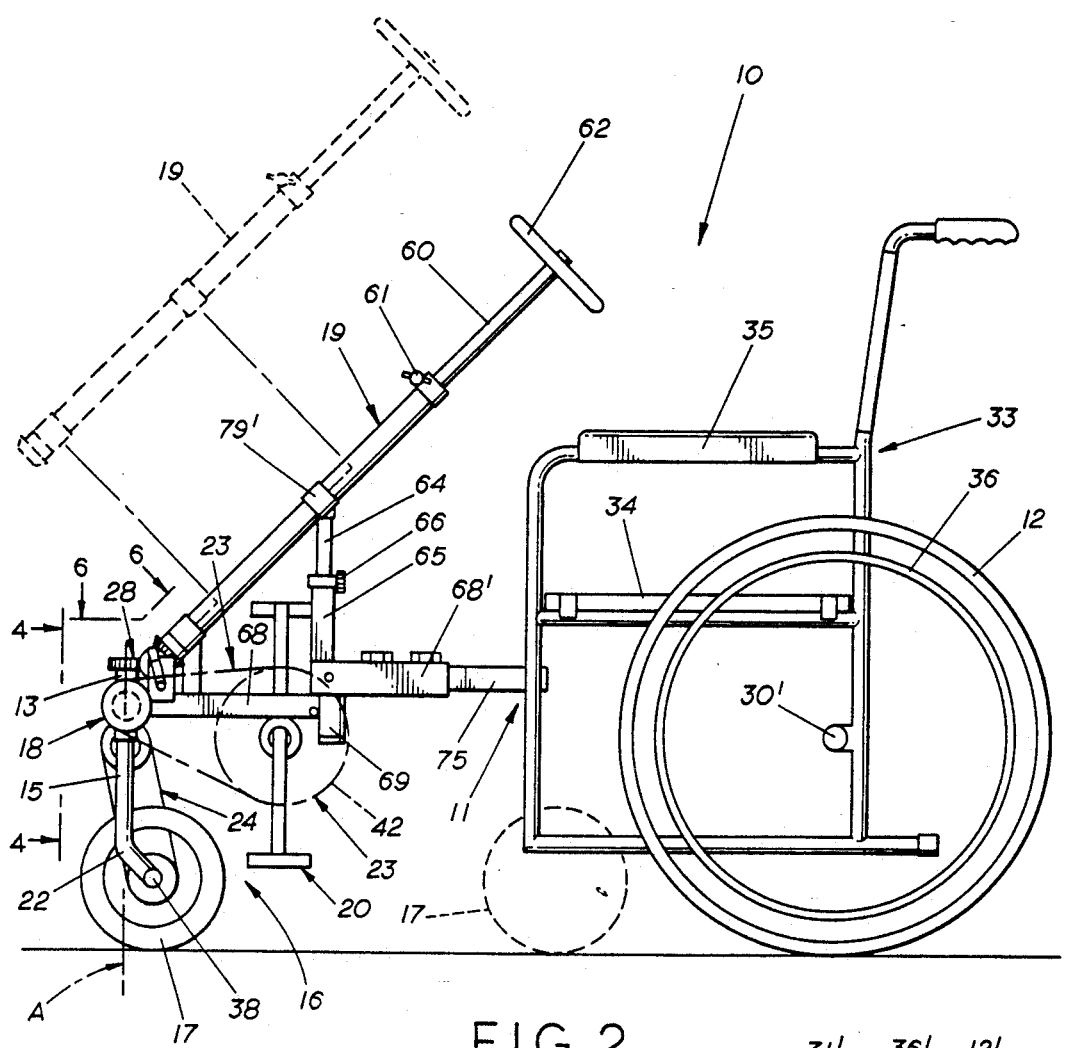
FIG. 2 is an elevational view of the left side of the wheeled framework.
Figure 3:
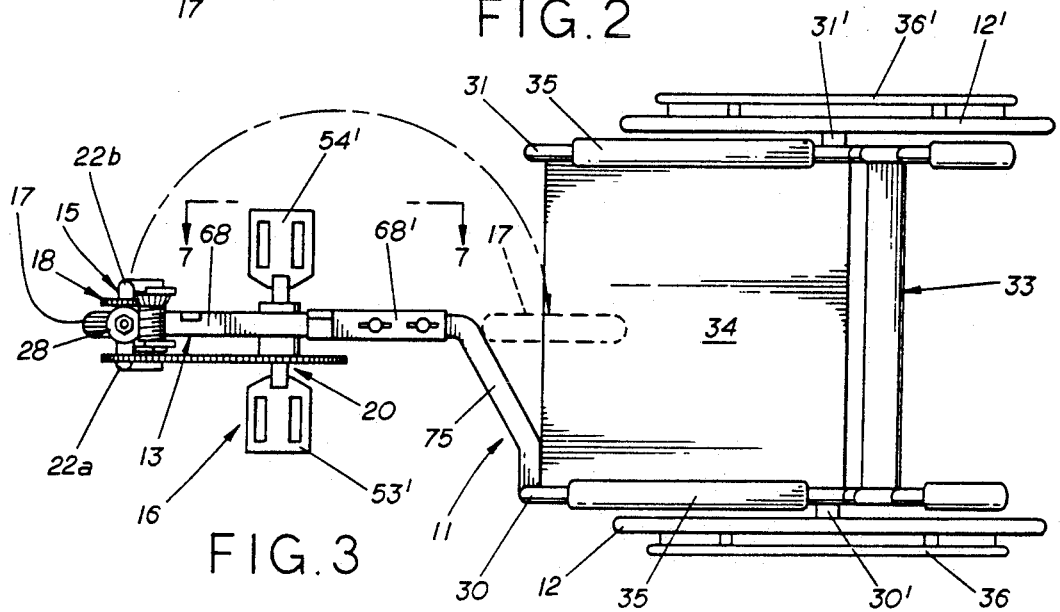
FIG. 3 is a top plan view of the wheeled framework.

Vertically-arranged, spaced-apart tubular side frames 30,31 support axles 30', 31' (FIGS. 1-3) to which rear wheels 12,12' are respectively journaled. Side frames 30,31 support a chair 33 having a seat 34 and horizontally disposed arm rests 35. Rear wheels 12,12' support hand-grip rings 36—36', respectively, for propelling and steering chair 33.

In the mobilized tricycle mode, front wheel 17 is well forward of the wheelchair's center of gravity and the two rear wheels 12,12' are slightly aft of the center of gravity with sufficient distance between them to improve the stability of chair 33 and prevent it from rolling over during turning.

Front wheel 17 has a center hub 37 (FIG. 5) of the type typically used on rear bicycle wheels. Hub 37 preferably has an internal clutch (not shown). It also could incorporate a multi-speed sprocket (not shown) to facilitate riding up a hill. Hub 37 is rotatably mounted on an axle 38 secured between the opposite, vertically-inclined end portions of legs 22a and 22b (FIGS. 1, 4) of fork 22.

Driving gear train 23 (FIG. 5) includes a crank sprocket wheel 42 which rotates with crank 20. An intermediate sprocket wheel 43 and an intermediate gear 44 are rotatably attached to an axle 45 which is fixedly secured to coupling member 14. The axes of crank 20 and of axle 45 are perpendicular to the vertical axis A of upright shaft 21. A flexible endless gearing chain 46 transmits torque from crank sprocket 42 to intermediate sprocket 43. Crank sprocket 42, chain 46, and sprocket 43 all lie in the same plane.

Figure 5:
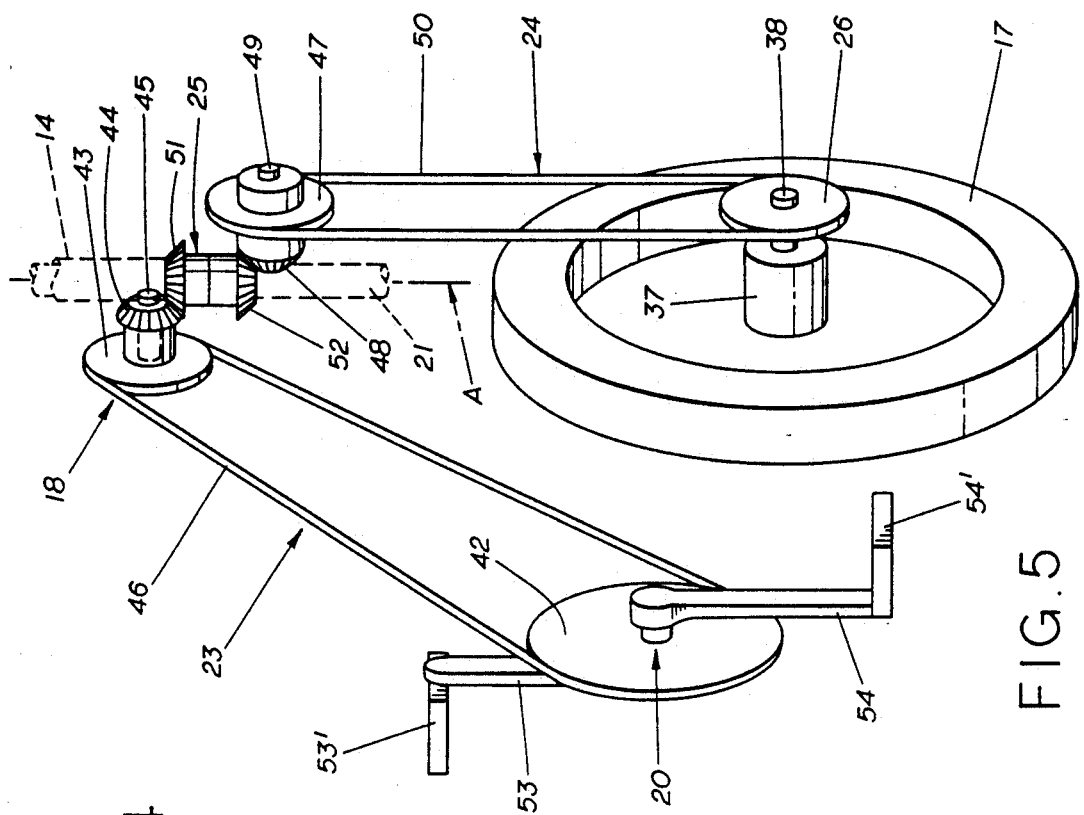
FIG. 5 is an operational schematic view of the driving and driven gear trains and of the miter gear unit therebetween.
Figure 4:
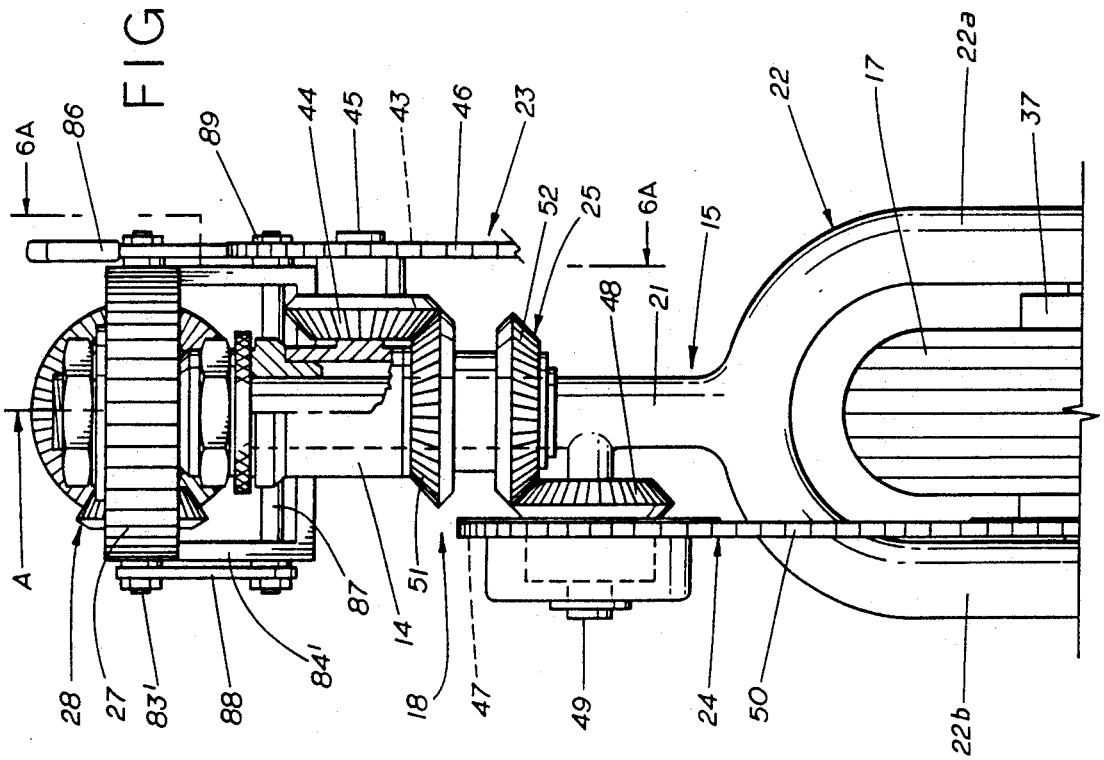
FIG. 4 is an elevational detail view taken on line 4—4 on FIG. 2.
Figure 6:
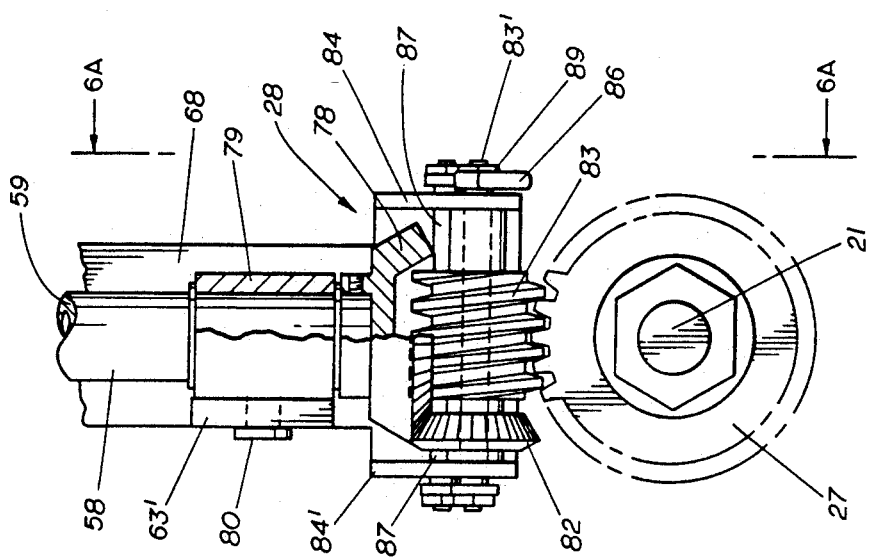
FIG. 6 is a detail top plan view taken on line 6—6 on FIG. 2.

Driven gear train 24 includes sprocket wheel 26 attached to the clutch (not shown) within hub 37 for rotation therewith. An intermediate sprocket wheel 47 and an intermediate gear 48 are rotatably attached to an axle 49 which is secured to upright shaft 21. A flexible endless gearing chain 50 transmits torque from sprocket 47 to hub sprocket 26. Hub sprocket 26, chain 50, and sprocket wheel 47 all lie in the same plane. The axes of axle 49 and of hub axle 38 are perpendicular to axis A of upright shaft 21 (FIGS. 4,5).

The torque-transmitting miter gear unit 25 is mounted on upright shaft 21 under coupling member 14 for free rotation in opposite horizontal angular directions about axis A of shaft 21. Miter gear unit 25 has a pair of axially-opposed, concentric, torque transmitting members, such as bevel gears 51,52, which are fixedly attached to each other back-to-back and are freely rotatably mounted on upright shaft 21. The axis about which bevel gears 51,52 rotate coincides with axis A of upright shaft 21. The rotation of bevel gears 51,52 is independent of the rotation of upright shaft 21, and vice versa.

A pair of diametrically-opposed crank arms 53,54 (FIGS. 1,7) are coupled to the opposite ends of crank 20. Arms 53,54 have foot pedals 53',54', respectively, which can pivot 90° in a vertical plane about a transverse pin 55, as shown by the dotted lines. Each pedal is provided with a bearing assembly 56 that allows it to rotate about a short horizontal stub shaft 57.

Steering means 19 (FIGS. 1,2,4,6) include, in addition to steering gear train 28, a tubular steering link 58 whose bore 59 (FIG. 6) adjustably receives a steering column 60 having a steering wheel 62.

Steering column 60 can slide into and out of bore 59 and it can be secured therewithin at a desired position by a bolt 61 so as to maintain steering wheel 62 in the open space above chair seat 34 and at a predetermined height to fit the rider, thereby fostering favorable conditions for easy steering without much effort and fatigue.

An upright shoulder 63 (FIG. 7) extends from the top end of a square leg 64 which is movably received within a hollow square beam 65 to which it can be adjustably secured by a bolt 66.

Beam 65 can rotate 90° in a vertical plane about the axis of a pivot pin 67 held in place by snap rings (not shown). Pin 67 is secured to a square beam 68 forming part of forward frame 13.

An extension square sleeve 68' (FIGS. 1,7,7A) has one end pivotally attached to beam 68 through a hinge assembly 69 which includes a box 70 and a pin 71 extending downwardly from sleeve 68'. Box 70 is at one end of beam 68. Pin 71 can rotate within bore 72 of box 70. The other end of beam 68 carries coupling member 14. The rotation of beam 68 and hence of frame 13 can be prevented by a bolt 74 extending through beam 65 and sleeve 68'.

The opposite open end of sleeve 68' adjustably receives an arm 75 forming part of side frame 30. The adjusted position of sleeve 68' is secured by hand-operated bolts 76. The extension sleeve 68' releasably connects and suspends forward frame 13 to side frames 30,31 to thereby form a unitary wheeled tricycle framework 10.

Steering column 60 (FIGS. 1,2,6A,7,7A) is angularly positioned relative to axis A of shaft 21 so that their axes intersect. The upper end of tubular link 58 is supported by shoulder 63 on leg 64 and its lower end is supported by a lower shoulder 63' on beam 68. The angle of inclination of steering column 60 is adjustable by extending or shortening the length of leg 64 above beam 65.

Figure 7:
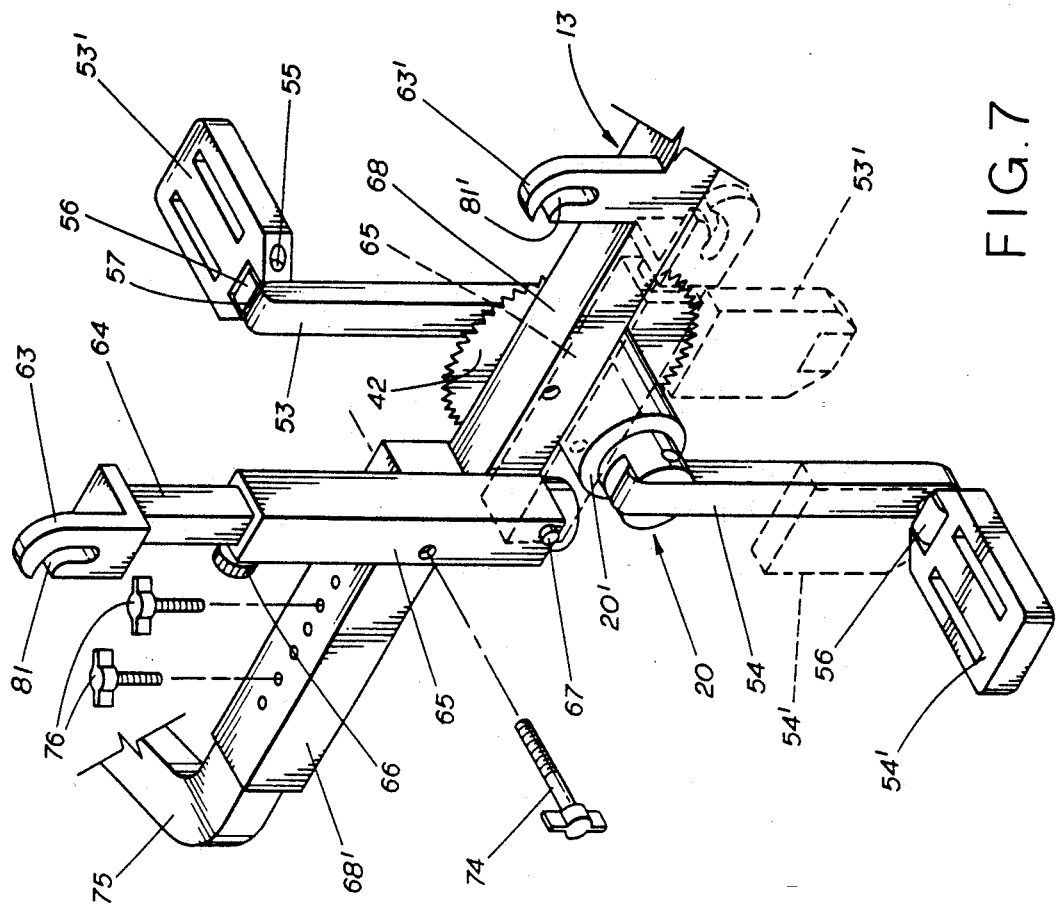
FIG. 7 is an enlarged partial detail isometric view taken on line 7—7 on FIG. 3.

Steering gear train 28 (FIGS. 1,4,6) includes a pinion gear 78 which is attached to the outer end of tubular link 58. A lower collar 79 around pinion gear 78 has a securing lower pin 80 which slides into a slanted slot 81 in lower shoulder 63. An upper collar 79' around tubular link 58 has a securing pin 80' which slides into a slanted slot 81 in upper shoulder 63 (FIG. 7).

Thus pins 80,80' detachably secure tubular link 58 and hence steering column 60.

Pinion gear 78 drives a bevel gear 82 (FIGS. 4,6,6A,7A) which drives a worm 83. Worm 83 drives worm gear 27 that is fixedly secured to upright shaft 21. Bevel gear 82 and worm 83 are journaled on an axle 83' which is transversely mounted on the opposite shoulders 84, 84' extending upwardly and symmetrically from beam 68. The opposite ends of axle 83' extend through arcuate slots 85 in shoulders 84,84'. One end of axle 83' also extends through a spring-loaded lever 86 which pivots about a pin 87. Lever 86 has a spring detent 94. Opposite ends of axle 83' and of pin 87 are coupled by a link 88.

In its biased operative position, worm 83 is engaged with its mating pinion gear 78. In its inoperative position, as shown by the dotted line, worm 83 is disengaged from pinion gear 78 and lever 86 is secured to shoulder 84 by a nut 89.

The steering gear train 28 (FIGS. 1,4,6) transmits torque from steering wheel 62 to shaft 21 of steering frame 15 through steering column 60, link 58, pinion gear 78, bevel gear 82, worm 83, worm gear 27 to thereby rotate fork 22 in opposite horizontal angular directions so as to control the forward direction of travel of its wheel 17.

Steering gears 78, 82, 83 and 27 are sized so that shaft 21 rotates at a slower speed than that of steering wheel 62.

A very important aspect of worm 83 is that it transmits power from steering wheel 62 to shaft 21, but it prevents reverse power transfer from shaft 21 back to steering wheel 62. Hence, the rotation of wheel 17 can only take place when steering wheel 62 is rotated by the rider in a clockwise or counter-clockwise direction.

In operation, when crank 20 is rotated counter-clockwise as viewed in (FIG. 1), forward wheel 17 will also rotate in a counter-clockwise forward direction.

More specifically, gearing chain 46 (FIGS. 1,4,5) transmits torque produced by limb action from crank sprocket 42 to hub sprocket 26 through intermediate sprocket wheel 43 and its bevel gear 44, miter gears 51,52, intermediate bevel gear 48 and its sprocket 47, and gearing chain 50, thereby forwardly propelling front wheel 17 and hence chair 33.

Conversely, when crank sprocket 42 is rotated clockwise, a reverse torque becomes exerted on hub 37 and its clutch thereby stopping rotation of front wheel 17.

At the same time, while front wheel 17 is being propelled forward it can be steered through its steering shaft 21 independent of crank 20 and its driving gear train 23. In this manner, the rider can ride around obstructions and move relatively fast in unobstructed areas without fear of loosing control over the direction and speed of travel of wheelchair 33.

While a conventional tricycle requires simultaneous movement of its pedals, front wheel and handlebars, front wheel 17 of wheeled framework 10 is steered independently of crank 20.

Because steering is independent of crank 20, the "leaning forward" problem, previously described in the background section, has been eliminated. Now when the rider naturally leans inward, the steering of wheel 17 is not affected.

Figure 11:
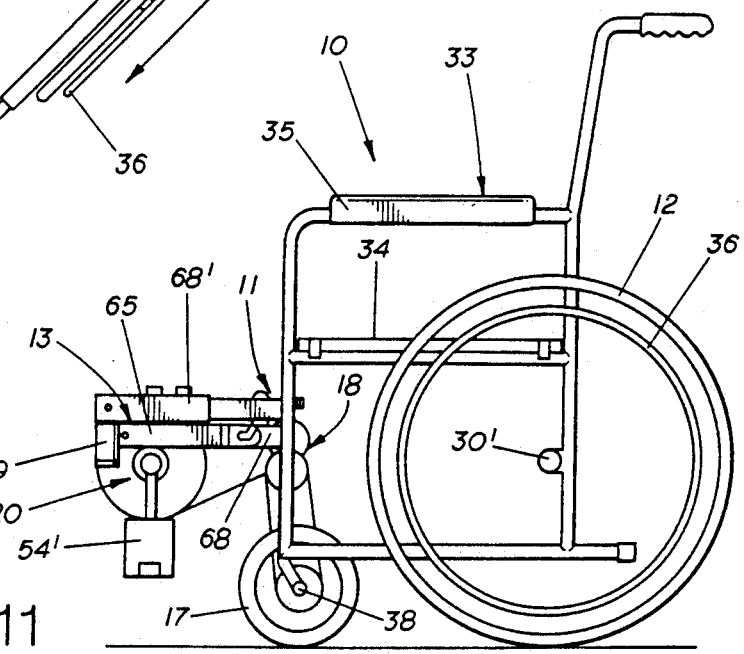
FIG. 11 is an elevational view of the left side of the wheeled framework with the front wheel already in its caster wheel mode.

The conversions from a mobilized cycle mode, with front wheel 17 engaging the ground forward of chair 33 (FIG. 1), to a caster wheel mode, with front wheel 17 engaging the ground as a caster wheel (FIG. 11), and vice versa, can be carried out by the rider himself using relatively simple hand-operated movements of bolts, levers and steering rings 36,36'.

Such a conversion first requires detaching tubular link 58 and its steering column 60 from shoulders 63,63', which allows pinion gear 78 (FIG. 6) to become disengaged from bevel gear 82. Then, lever 86 (FIG. 6A) is moved to its unbiased position causing worm 83 to disengage from worm gear 27 which frees shaft 21 and its front wheel 17 to spin freely as a caster wheel. As a direct consequence, the need for conventional directional caster wheels has been eliminated.

Figure 8:
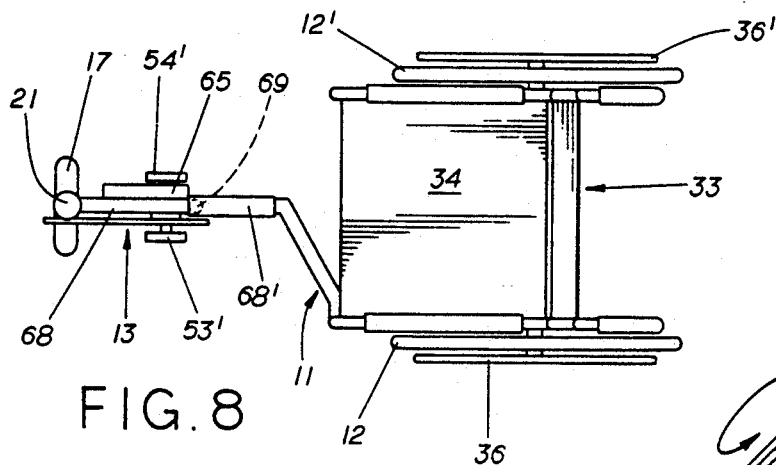
FIGS. 8-10 are top plan operational schematic diagrams of the wheeled framework illustrating three distinct transitional stages of the front wheel as it rotates from its mobile cycle mode toward its mobile caster wheel mode.
Figure 9:
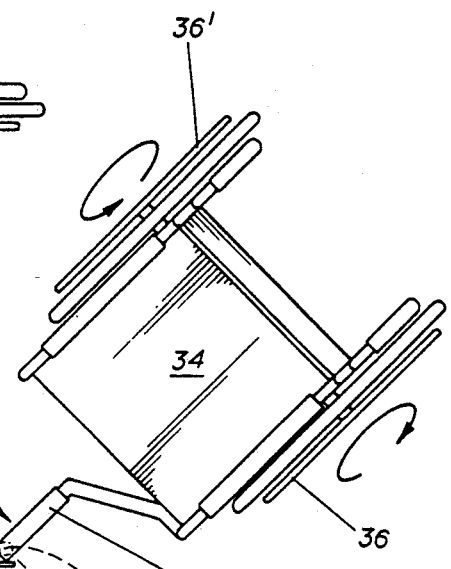
Figure 10:
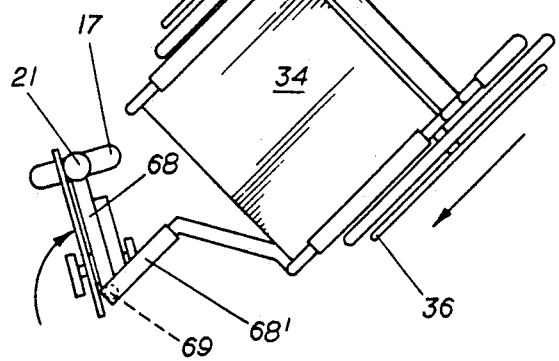

Finally, the user (1) pivots shaft 21 clockwise by 90° so that front wheel 17 is in the position shown in FIG. 8, (2) rotates clockwise beam 65 by 90° and locks it with bolt 74 to a horizontal position, as shown by the dotted lines in FIG. 7, (3) pivots clockwise pedals 53',54' by 90° to vertical positions, and (4) produces appropriate torques and linear forces, in the directions indicated by the arrows in FIGS. 9-10, by rotating one or both of hand-grip rings 36,36' until wheel 17 (FIG. 11) becomes positioned under seat 34 of chair 33.

In an alternate embodiment, wheeled framework 10 can utilize a hand-operated propulsion means instead of a foot-operated propulsion means. Thus, gear train 24 (FIGS. 5, 12) can be driven manually with a pivoted hand lever 90 attached to a crank 91 which imparts rotation to intermediate gear 44 of driving gear train 23 through a meshing gear 92. Gear 44 transmits rotational motion to front wheel 17 through miter gear unit 25, chain 50 and hub sprocket 26.

The wheeled framework 10 is simple in design, compact in use, light-weight, inexpensive to manufacture, and easy to assemble, dismantle and convert from one function to another without special tools and without the need for dexterity and unusual arm strength.

It will be also appreciated that the objects set forth above have been accomplished while other advantages and modifications will readily become apparent to those skilled in the art.

What I claim is:

1. A steered wheeled framework, comprising:

a rear frame having at least one rotatably mounted rear wheel;

a forward frame having a coupling member and a limb-propelled drive means;

a steering frame including a steering shaft coaxially and rotatably received by said coupling member, and said steering frame having a front wheel mounted for rotation relative to said steering shaft about an axis substantially perpendicular to the longitudinal axis of said steering shaft;

a transmission means for transmitting rotational motion from said limb-propelled drive means to said front wheel, said transmission means including:

a driving gear train movably coupled to said forward frame, a driven gear train movably coupled to said steering frame, and a pair of axially-opposed torque transmitting gears coupled to each other and positioned (1) to have relative free rotation around said steering shaft about said longitudinal axis, (2) to operatively engage said driving gear train and said driven gear train so as to transfer rotational motion from said driving gear train to said front wheel through said driven gear train, and (3) to permit rotation by said steering shaft and said driven gear train about said longitudinal axis while said forward frame and said driving gear train remain stationary;

steering means including a limb-controlled steer means operatively independent from said limb-propelled drive means; and said steering means being coupled to said steering frame for (1) transmitting rotational motion from said steer means to said steering shaft thereby steering said steering frame, said front wheel, and said driven gear train carried by said steering frame, and (2) selectively maintaining said front wheel responsive to rotational steering motion stemming only from said steering means.

2. A wheeled framework according to claim 1, wherein said steering shaft has a dependent fork having legs;

said front wheel has a center hub rotatably mounted on an axle supported between said legs, and a hub sprocket wheel coupled to said hub for rotation therewith;

said limb-propelled drive means include a rotatably-mounted crank having a pair of diametrically-opposed crank arms and foot pedals;

said driving gear train concludes a crank sprocket wheel rotatable with said crank, an intermediate gear rotatably coupled to a shaft fixedly secured to said coupling member, and a chain linking said sprocket wheels of said driving gear train;

said driven gear train includes an intermediate gear rotatably coupled to an axle fixedly secured to said steering shaft, an intermediate sprocket wheel rotatable with said intermediate gear, and a chain linking said hub sprocket wheel and said intermediate sprocket wheel for rotating said front wheel; and said pair of torque transmitting gears are coaxially mounted on said steering shaft under said coupling member.

3. A wheeled framework according to claim 1, wherein said steering means include a steering column, a steering gear train is operatively coupled to a proximal end of said column, and said limb-controlled steer means is a steering wheel coupled to a distal end of said column;

and said steering gear train includes:

a pinion gear coupled to said steering column, a bevel gear driven by said pinion gear, a worm driven by said bevel gear, and a worm gear secured to said steering shaft and driven by said worm for transmitting rotational steering motion from said steering wheel to said steering shaft through said steering column, pinion gear, bevel gear, worm and worm gear, thereby steering said steering frame, front wheel, and driven gear train relative to said forward frame and said driving gear train, and said worm selectively maintaining said front wheel responsive only to said rotational steering motion stemming from said steer means.

4. A wheeled framework according to claim 3, and means for selectively disengaging said worm from said worm gear thereby freeing said steering shaft, said front wheel, and said driven gear train to spin freely; and said disengaging means having a biased operative position, in which said worm is engaged with said worm gear, and an inoperative position, in which said worm is disengaged from said worm gear.

5. A steered wheeled framework, comprising:

a rear frame including vertically-arranged, spaced-apart tubular parallel side frames supporting two spaced-apart, rotatably-mounted rear wheels and a chair therebetween, and said rear wheels having hand-grip rings for propelling and steering said chair;

a forward frame having a coupling member and a limb-propelled driving means;

a steering frame rotatably coupled to said coupling member and having a rotatably mounted front wheel;

a limb-controlled steering means coupled to said steering frame for steering said front wheel independently of said driving means clockwise and counterclockwise in response to a steering force;

a transmission means for transmitting rotational motion from said driving means to said front wheel, said transmission means including:

a driving gear train movably coupled to said forward frame, a driven gear train movably coupled to said steering frame for rotating said front wheel, and a torque-transmitting gear unit for transferring torque between said driving and driven gear trains; and means for converting said wheeled framework from a mobilized cycle mode, with said front wheel engaging the ground forward of said chair as a cycle wheel, to a caster wheel mode with said front wheel engaging the ground as a caster wheel.

6. A wheeled framework according to claim 5, wherein said converting means include means for allowing said front wheel to spin freely as said caster wheel.

7. A steered wheeled framework, comprising:
a rear frame having at least one rotatably mounted rear wheel;
a forward frame having a tubular coupling member and a limb-propelled driving means including a rotatably-mounted crank having a pair of diametrically-opposed crank arms and a foot pedal for turning each crank;
a steering frame rotatably coupled to said coupling member and including a steering shaft and a dependent fork having legs;
said coupling member coaxially and rotatably receiving said steering shaft;
a front wheel having a center hub rotatably mounted on an axle supported between said legs, and a hub sprocket wheel coupled to said hub for rotation therewith;
a limb-controlled steering means coupled to said steering frame for steering said front wheel clockwise and counterclockwise in response to a steering force and independently of said driving means;
a transmission means for transmitting rotational motion from said driving means to said front wheel, and said transmission means including:
a driving gear train movably coupled to said forward frame and including a crank sprocket wheel rotatable with said crank,
an intermediate gear rotatably coupled to a shaft fixedly secured to said coupling member, an intermediate sprocket wheel rotatable with said intermediate gear, and a chain linking said sprocket wheels of said driving gear train;
a driven gear train movably coupled to said steering frame for rotating said front wheel; and
a torque-transmitting gear unit for transferring torque between said driving and driven gear trains.

8. A wheeled framework according to claim 7, wherein
said driven gear train includes an intermediate sprocket wheel rotatable with an intermediate gear which is rotatably coupled to an axle fixedly secured to said steering shaft, and a chain linking said hub sprocket wheel and said intermediate sprocket wheel for rotating said front wheel.

9. A wheeled framework according to claim 7, wherein
said torque-transmitting gear unit is rotatably mounted on said steering shaft under said coupling member; and
said gear unit has a pair of axially-opposed, concentric, torque transmitting members coupled to each other back-to-back for free rotation around said steering shaft, in opposite horizontal angular directions, whereby the rotation of said torque-transmitting members is independent of the rotation of said steering shaft.

10. A wheeled framework according to claim 9, wherein
said steering means includes a steering column;
a steering wheel at one end of said column and a steering gear train at the opposite end of said column; and
said steering gear train includes:
a pinion gear coupled to said steering column,
a bevel gear driven by said pinion gear,
a worm driven by said bevel gear, and
a worm gear secured to said steering shaft and driven by said worm for transmitting rotational steering power from said steering wheel to said steering shaft-through said steering column, pinion gear, bevel gear, worm and worm gear, thereby steering said steering frame, front wheel, and driven gear train relative to said forward frame and to said driving gear train.

11. A wheeled framework according to claim 10, wherein
said worm selectively transmits power from said steering wheel to said steering shaft and to said front wheel, and said worm blocks reverse power transfer from said front wheel through said steering shaft and back to said steering wheel.

12. A wheeled framework according to claim 11, and
means for converting said wheeled framework from a mobilized cycle mode, with said front wheel engaging the ground forward of said chair as a cycle wheel, to a caster wheel mode with said front wheel engaging the ground as a caster wheel; and
said converting means include a spring-loaded lever having a biased operative position in which said worm is engaged with said worm gear and an inoperative position in which said worm is disengaged from said worm gear.

13. A wheeled framework according to claim 12, wherein
said foot pedals are foldable about a transverse pin perpendicular to a horizontal shaft and can pivot 90° in a vertical plane about a transverse pin, and each pedal has a bearing assembly that allows the pedal to rotate about said horizontal shaft.

14. A steered wheeled framework, comprising:
a rear frame having at least one rotatably mounted rear wheel;
a forward frame having a coupling member;
a limb-propelled drive means;
a steering frame including a steering shaft coaxially and rotatably received by said coupling member, and said steering frame having a front wheel mounted for rotation relative to said steering shaft;
a transmission means for transmitting rotational motion from said limb-propelled drive means to said front wheel, and said transmission means including:
a driving means movably coupled to said forward frame,
a driven means movably coupled to said steering frame, and
a pair of axially-opposed torque transmitting gears coupled to each other and positioned for relative free rotation around said steering shaft about a longitudinal axis thereof, and to engage said driving means and said driven means so as to transfer rotational motion from said driving means to said front wheel through said driven means, and to permit rotation by said steering shaft and said driven means while said forward frame and said driving means remain stationary;
a limb-controlled steer means operatively independent from said limb-propelled drive means; and
a steering gear train operatively coupled to said steer means for transmitting steering motion from said steer means to said steering shaft thereby steering said steering frame, said front wheel, and said driven means.

15. A wheeled framework according to claim 14, wherein said steering gear train (1) permits rotational steering of said steering shaft and of said driven means coupled thereto, and (2) selectively maintains said front wheel responsive only to rotational steering motion stemming from said steer means.

16. A wheeled framework according to claim 15, wherein said steering means include a steering column;

said limb-controlled steer means is a steering wheel at a distal end of said column;

said steering gear train is operatively coupled to a proximal end of said column, and said steering gear train includes:

a pinion gear coupled to said steering column, a bevel gear driven by said pinion gear, a worm driven by said bevel gear, and a worm gear secured to said steering shaft and driven by said worm for transmitting steering power from said steering wheel to said steering shaft through said steering column, pinion gear, bevel gear, worm and worm gear, thereby steering said front wheel and said driven means relative to said forward frame and said driving means.

17. A wheeled framework according to claim 16, and means for disengaging said worm from said worm gear, thereby freeing said steering shaft, said front wheel, and said driven means to spin freely; and said disengaging means having a biased operative position, in which said worm is engaged with said worm gear, and an inoperative position, in which said worm is disengaged from said worm gear.

18. A steered wheeled framework, comprising:

a rear frame having at least one rotatably mounted rear wheel;

a forward frame having a coupling member and a limb-propelled drive means;

a steering frame including a steering shaft rotatably coupled to said coupling member and having a rotatably coupled front wheel;

a transmission means for transmitting rotational motion from said limb-propelled drive means to said front wheel;

a limb-controlled steer means;

steering means coupled to said steering frame, said steering means including a steering column;

said limb-controlled steer means being at a distal end of said column;

a steering gear train coupled to a proximal end of said column, and said steering gear train including:

a pinion gear coupled to said steering column, a bevel gear driven by said pinion gear, a worm driven by said bevel gear, and a worm gear secured to said steering shaft and driven by said worm for transmitting steering power from said steering wheel to said steering shaft through said steering column, pinion gear, bevel gear, worm and worm gear, thereby steering said front wheel and said driven means relative to said forward frame and said driving means.

19. A wheeled framework according to claim 18, wherein said transmission means includes:

a driving gear train movably coupled to said forward frame, a driven gear train movably coupled to said steering frame, and a pair of axially-opposed torque transmitting gears coupled to each other and positioned for relative free rotation around said steering shaft about a longitudinal axis thereof, and to engage said driving gear train and said driven gear train so as to transfer rotational motion from said driving gear train to said front wheel through said driven gear train, and to permit rotation by said steering shaft and said driven gear train while said forward frame and said driving gear train remain stationary; and said steering gear train (1) permits rotational steering of said steering shaft and of said driven means coupled thereto, and (2) maintains said front wheel selectively responsive to rotational steering motion stemming only from said steer means.

20. A wheeled framework according to claim 19, wherein said pair of axially-opposed torque transmitting gears are bevel gears having no relative rotation therebetween.

21. A wheeled framework according to claim 19, wherein said steering shaft and said front wheel are pivotable in opposite horizontal angular directions 360° relative to the longitudinal axis of said steering shaft and, when said steering shaft is pivoted 180°, said front wheel changes from forward motion to reverse motion.

22. A wheeled framework according to claim 3, wherein said steering shaft and said front wheel are pivotable in opposite horizontal angular directions nearly 360° relative to the longitudinal axis of said steering shaft, and when said steering shaft is pivoted 180°, said front wheel changes from forward motion to reverse motion.

23. A wheeled framework according to claim 14, wherein said steering shaft and said front wheel are pivotable in opposite horizontal angular directions 360° relative to the longitudinal axis of said steering shaft, and when said steering shaft is pivoted 180°, said front wheel changes from forward motion to reverse motion.

* * * * *